E. F. SHUE.
LIQUID WEIGHER.
APPLICATION FILED JULY 7, 1908.
939,103.
Patented Nov. 2, 1909.
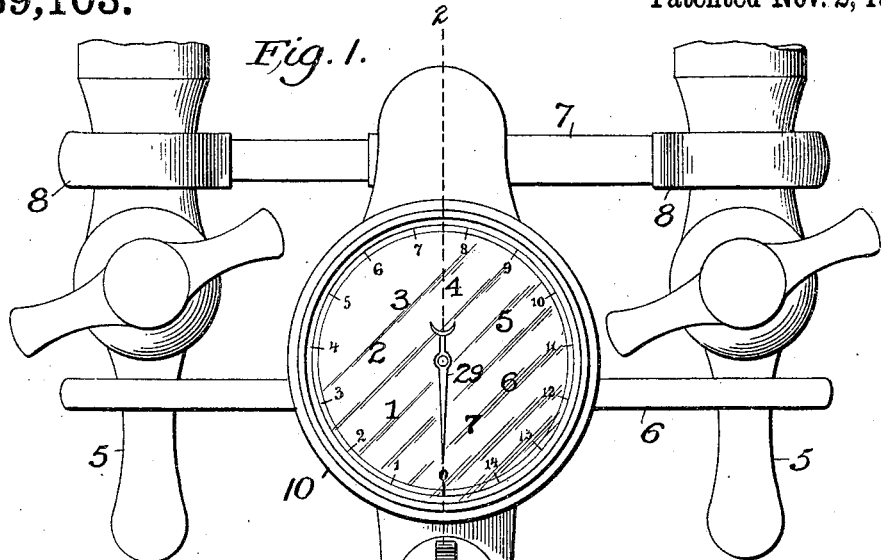
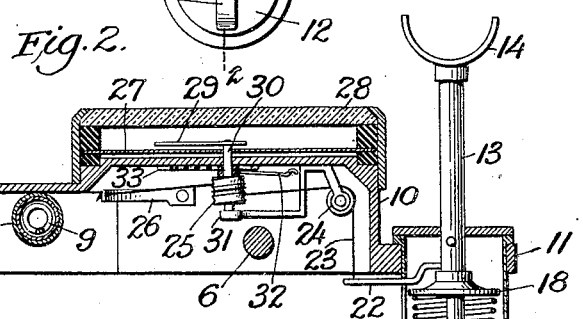
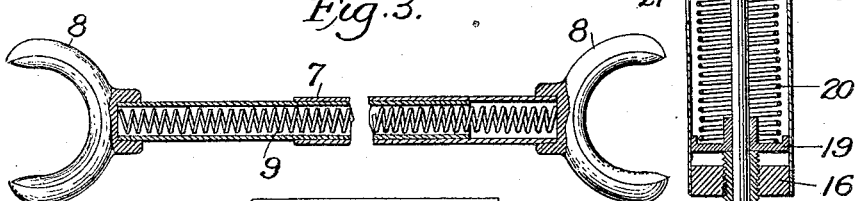
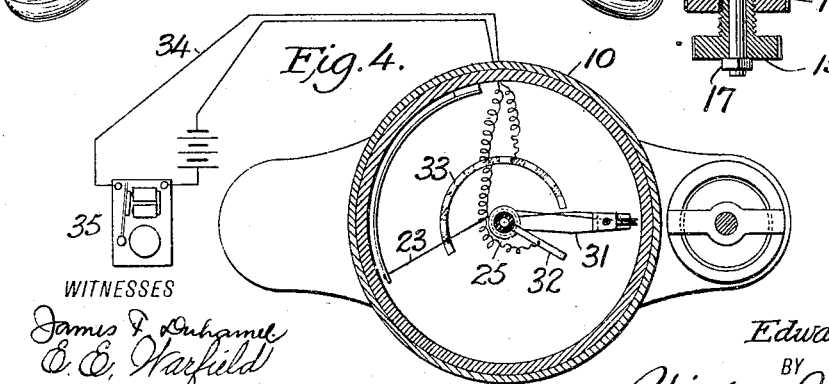
WITNESSES
INVENTOR,
Edward F. Shue,
BY
Victor J. Evans
ATTORNEY

UNITED STATES PATENT OFFICE.

EDWARD F. SHUE, OF NEW YORK, N. Y.

LIQUID-WEIGHER.

939,103.  Specification of Letters Patent.  Patented Nov. 2, 1909.

Application filed July 7, 1908. Serial No. 442,292.

*To all whom it may concern:*

Be it known that I, EDWARD F. SHUE, a citizen of the United States, residing at New York, in the county of New York and State of New York, have invented new and useful Improvements in Liquid-Weighers, of which the following is a specification.

This invention relates to weighing devices and particularly to that class to be attached to faucets so that as the liquid is drawn from the latter into a receptacle it is weighed so that the proper charge may be made, the receptacle being hung on a plunger and adapted to catch the liquid and as it flows and increases the weight on the plunger which is carried down overcoming the tension of a spring and by means of a band rotates a pulley carrying an index hand to indicate the amount of liquid entering the receptacle.

These and other details and objects of the invention will be more fully described in the following specification set forth in the claims and illustrated in the drawings, where:

Figure 1 is a plan view of the device. Fig. 2 is a cross sectional view on the line 2—2 of Fig. 1. Fig. 3 is a side view of the rear supporting bar. Fig. 4 is a horizontal sectional view below the dial.

The weighing device here illustrated is especially adapted for beer and is shown as being supported on the faucets 5 by means of the cross bar 6 which lies upon the faucets and a rear collapsible cross bar 7 with forks 8, each at the outer end of a tube, the two tubes being forced outward by the inclosed coiled spring 9 causing the forks to embrace the faucets and the dislodgment of the weigher is prevented.

Carried by the two cross arms is a casing 10 with a forward extension 11 carrying a depending cylinder 12 and in the latter plays a plunger 13 with a hook or socket 14 at its upper end to receive the bail of the bucket into which the beer is to be drawn, while its lower end is threaded and is enveloped by an adjusting thumb screw 15 which plays in the bottom 16 of the cylinder and is prevented from removal by the nut 17 at the bottom of the plunger. The plunger has secured to it a disk 18 and a loose disk 19 surrounds it, and between the two a spring 20 is placed to be compressed when a weight is placed upon the plunger, the lower disk 19 resting on the adjusting screw 15 and is moved up or down by it so as to bring it nearer to or farther from the disk to influence the tension of the spring 20, and provide for the weight of the receptacle.

Projecting from the side of the plunger 13 and through a slot 21 in the side of the cylinder is an arm 22 carrying at its outer end a cord 23 which passes upward in the casing 10, over a pulley 24 and around a small drum 25 terminating at a flat spring 26 which holds it taut as it encircles the drum.

In the upper side of the casing 10 is a dial 27 with a glass covering 28 and an index hand 29 attached to the upper end of the shaft 30 of the drum 25 sweeps over the dial as the arm 22 is depressed, the movement of the hand being proportional to the depression of the arm and the hand indicating on the dial the number of glasses by the outer figures or the pounds of beer by the inner figures that are being drawn from one or the other faucet.

From the position it occupies on the hook 14 the bucket is located beneath both of the faucets so that either may be opened.

Attached to the shaft 30 is a finger 32 which at certain periods as the shaft turns, passes over a segment 33 that is insulated at certain points corresponding with the number on the dial so that as the finger moves around the segment with the index hand 29 it opens and closes the circuit 34 and rings the bell 35. The intervals with which the finger makes its contacts and rings the bell, indicates the number of glasses or pounds of beer passing out of the faucet and will warn the attendant when a certain amount of liquid is in the receptacle.

The shaft 30 is supported at its lower end by a bracket 31.

The device here described and shown is cheap and simple being easily applied to the faucets or quickly removed when its use is not required. Its parts are few and not liable to get out of order and it is obvious that their arrangement may be altered or modified without departing from their essential features.

What I claim as new and desire to secure by Letters Patent is:

1. In a device for weighing liquids, the combination with a frame and horizontal dial, of a tube depending from the frame, a spring within the tube, a plunger supported in its elevated position by the spring, a hand for the dial, and means connecting the plunger and hand to indicate the depression of the former.

2. In a device for weighing liquids, the combination with a frame and horizontal dial, of a hand pivoted in the dial, a depending tube carried by the frame, a plunger playing through the tube and having a disk near its upper end, a spring between the disk and the bottom of the tube, means for adjusting the tension of the spring, a support on the plunger for a receptacle, a cord connecting the plunger and the hand, and a spring at the end of the cord.

3. In a device for weighing liquids, the combination with a dial having cross arms to be supported by faucets, of a pivoted hand in the dial, a vertical plunger with supporting means for a liquid receptacle, a spring normally elevating the plunger, a lateral arm on the plunger, adjusting means for the spring, and means connecting the arm with the hand to cause the rotation of the latter on its pivot when the plunger is depressed.

4. In a device for weighing liquids, the combination with a casing, of a dial and indicator hand, cross arms for supporting the casing, a tube depending from the casing, a plunger with lateral arm, a spring surrounding the plunger to elevate it, adjusting means for the spring in the bottom of the tube, a cord connecting the hand with the lateral arm of the plunger, and means for putting the cord under tension.

5. In a device for weighing liquids, the combination with a casing of a rigid cross arm, extensible arms with forks at their ends to coöperate with the rigid arm in supporting the casing, a plunger with a hook at its upper end, an adjusting screw at its lower end, a spring under compression, a dial on the casing, an indicator hand, a drum on the shaft of same, a cord connecting the plunger with the drum and a spring at the outer end of the cord.

6. In a device for weighing liquids, the combination with a casing, of a cross arm with forks for supporting the casing, a vertical plunger for carrying a liquid receptacle, a spring encircling same, means for compressing the spring, a dial, and indicator hand for the dial, means connecting the plunger with the hand, an electric circuit with a bell, a contact finger connected with the hand and the circuit and a contact segment in the circuit and in the path of the finger when it moves.

In testimony whereof I affix my signature in presence of two witnesses.

EDWARD F. SHUE.

Witnesses:
MAE W. CLINTON,
JAMES F. DUHAMEL.